US007026982B2

(12) United States Patent
Toda et al.

(10) Patent No.: US 7,026,982 B2
(45) Date of Patent: *Apr. 11, 2006

(54) CARRIER-PHASE-BASED RELATIVE POSITIONING DEVICE

(75) Inventors: Hiroyuki Toda, Nishinomiya (JP); Naomi Fujisawa, Nishinomiya (JP); Masaru Fukuda, Nishinomiya (JP)

(73) Assignee: Furuno Electric Ompany Limited, Nishinomiya (JP)

( * ) Notice: Subject to any disclaimer, the term of this patent is extended or adjusted under 35 U.S.C. 154(b) by 7 days.

This patent is subject to a terminal disclaimer.

(21) Appl. No.: 10/758,034

(22) Filed: Jan. 16, 2004

(65) Prior Publication Data
US 2004/0145518 A1 Jul. 29, 2004

Related U.S. Application Data

(63) Continuation of application No. 10/321,666, filed on Dec. 18, 2002, now Pat. No. 6,720,914.

(30) Foreign Application Priority Data
Dec. 19, 2001 (JP) .............................. 2001-386162

(51) Int. Cl.
H04B 7/185 (2006.01)
G01S 5/02 (2006.01)
(52) U.S. Cl. ................................. 342/357.04
(58) Field of Classification Search ........... 342/357.01, 342/357.02, 357.04, 357.06; 701/213, 215
See application file for complete search history.

(56) References Cited

U.S. PATENT DOCUMENTS

| 5,442,363 | A | 8/1995 | Remondi |
| 5,548,293 | A | 8/1996 | Cohen |
| 6,061,631 | A * | 5/2000 | Zhang ......................... 701/213 |
| 6,259,398 | B1 * | 7/2001 | Riley ..................... 342/357.04 |
| 6,424,915 | B1 | 7/2002 | Fukuda et al. |
| 6,611,228 | B1 * | 8/2003 | Toda et al. ............. 342/357.04 |
| 6,720,914 | B1 * | 4/2004 | Toda et al. ............. 342/357.04 |

FOREIGN PATENT DOCUMENTS

| EP | 0 437 372 A2 | 7/1991 |
| GB | 2 280 077 A | 1/1995 |
| WO | WO 06/08730 A1 | 3/1996 |

* cited by examiner

Primary Examiner—Dao Phan
(74) Attorney, Agent, or Firm—Birch, Stewart, Kolasch & Birch, LLP

(57) ABSTRACT

A carrier-phase-based relative positioning device employs a signal processing method which makes it possible to continue estimation of integer ambiguity values even when the number of positioning satellites has changed, determine an integer ambiguity value by efficiently verifying the integer ambiguities in a short time, and calculate a baseline vector. The positioning device includes an integer ambiguity resolving section which determines integer ambiguities of single or double phase differences using a Kalman filter and lambda notation. The Kalman filter is used to calculate estimated values of floating ambiguities and the lambda notation is used to calculate estimated values of the integer ambiguities based on the floating ambiguities. A candidate of a potentially true integer ambiguity that is considered most reliable is determined through various verification processes. When the number of positioning satellites has increased or decreased, or when a reference satellite has been switched, a floating ambiguity after the change in satellite information is estimated from a baseline vector estimated before the change.

23 Claims, 4 Drawing Sheets

CARRIER-PHASE-BASED RELATIVE POSITIONING DEVICE

This application is a continuation of application Ser. No. 10/321,666 filed on Dec. 18, 2002 now U.S. Pat. No. 6,720,914, the entire contents of which are hereby incorporated by reference and for which priority is claimed under 35 U.S.C. § 120; and this application claims priority of Application No. 2001-386162 filed in Japan on Dec. 19, 2001 under 35 U.S.C. § 119.

BACKGROUND OF THE INVENTION AND RELATED ART STATEMENT

1. Field of the Invention

The present invention relates generally to a carrier-phase-based relative positioning device used in such apparatus as a global positioning system (GPS) compass which determines geographic direction from multiple relative position fixes obtained by using the phases of carrier signals received from GPS satellites or a real-time kinematic (RTK) GPS receiver which determines relative positions in real time by using the carrier phases of the GPS signals.

2. Description of the Prior Art

There exists a known method of determining relative positions by receiving radio signals transmitted from GPS satellites with multiple antennas and measuring the carrier phases of the signals. This method is conventionally used in an apparatus which determines relative positions of a mobile vehicle, such as a vessel.

Relative positions are determined in a manner described below in this kind of positioning apparatus.

A radio signal transmitted from one GPS satellite is received by multiple antennas and the phase of the carrier received by each antenna is determined. Then, using at least one pair of antennas, the difference between the phase of the carrier received by one antenna and the phase of the carrier received the by other antenna from the same GPS satellite (single phase difference) is determined. Alternatively, radio signals transmitted from two GPS satellites are received by multiple antennas and the phase of the carrier received by each antenna is determined. Then, using pairs of antennas, the difference between single phase differences obtained from the radio signals from the two GPS satellites (double phase difference) is determined. When the phase difference obtained by these methods is converted into the number of waves, the phase difference can be separated into an integral part and a fractional part. The fractional part of the phase difference can be directly measured by the measuring apparatus because it represents a value smaller than $2\pi$ in terms of carrier phase. It is however impossible to directly measure the integral part of the phase difference by the positioning apparatus. This integral part which is not directly measurable is referred to as integer bias, or ambiguity. It is possible to obtain a correct phase difference upon determining this ambiguity value. Relative positioning is made by calculating baseline vectors between a reference antenna and other antennas.

From a plurality of integer ambiguity values indirectly calculated, candidates of the potentially true integer ambiguity are obtained. Then, a single ambiguity value is selected through various verification processes and taken as the true integer ambiguity.

The aforementioned carrier-phase-based relative positioning device of the prior art has had problems shown below that should be overcome.

As stated above, the conventional carrier-phase-based relative positioning device determines carrier phase differences by constantly receiving radio signals from the same GPS satellite with multiple antennas. Each GPS satellite transmits radio waves containing a unique identification signal and the positioning device identifies and uses the radio waves transmitted from the same GPS satellite by reference to the identification signal. The carrier-phase-based relative positioning device calculates single or double phase differences upon receiving the radio waves from a specific GPS satellite in this way and determines the integer ambiguity and baseline vector based on these observations.

As long as continued reference is made to the radio waves transmitted from the same GPS satellite, the integer ambiguity does not vary with time. Thus, once an integer ambiguity value has been determined, it is possible to estimate the true integer ambiguity by reference to that integer ambiguity.

Since each GPS satellite orbits earth, however, its position varies with the lapse of time. Therefore, the angle of elevation of the GPS satellite varies from a high value to a low value, and vice versa. When the elevation of the GPS satellite varies from a high angle to an angle less than a specific value, it would become no longer possible to receive the radio waves transmitted from the GPS satellite with the antennas. On the other hand, when the elevation of the GPS satellite varies from a low angle to an angle above the specific value, the radio waves transmitted from the GPS satellite which could not been received by the antennas would become possible to receive from a particular point in time onward. For this reason, the number of GPS satellites from which the antennas can receive radio waves varies with the lapse of time The carrier-phase-based relative positioning device normally calculates the integer ambiguity and baseline vector by reference to radio waves from as many GPS satellites as possible to obtain accurate position information. Therefore, if the number of satellites changes during the course of calculation, it is necessary to recalculate the integer ambiguity from the beginning. This is time-consuming and results in a waste of already accumulated data.

The aforementioned method of determining the integer ambiguity using the double phase difference requires a satellite to be used as a reference (hereinafter referred to as the reference satellite). In the double phase difference method, it becomes impossible to estimate the integer ambiguity value when it becomes impossible to receive radio waves from the reference satellite. When the elevation of the reference satellite becomes low, for example, it would become impossible for the antennas to receive the radio waves from the reference satellite, making it impossible to calculate the double phase difference. In such a case, it is necessary at that point in time to switch the reference satellite to another GPS satellite of which radio waves can be received by the antennas. Again, it becomes impossible in this case to continue estimation of the integer ambiguity value, making it necessary to recalculate the integer ambiguity from the beginning.

In verifying candidates of the potentially true integer ambiguity obtained as described above by the aforementioned conventional methods, there can arise a case where a wrong integer ambiguity value is chosen as the true integer ambiguity. This kind of error is likely to occur when the number of GPS satellites is small. Such errors could more or less occur in verifying the candidates of the true integer ambiguity no matter what kind of currently available verification process is used. The more stringent the verification process used in verifying the candidates of the true integer ambiguity, the more reliable the integer ambiguity obtained. A stringent verification process results in an extended measuring time, however. On the contrary, it would be possible to obtain a potentially true integer ambiguity in a short time if verification is carried out with somewhat broader range of permissible deviations. This, however, results in poorer accuracy. What is needed in carrier-phase-based relative positioning is a method of verifying the candidates of the potentially true integer ambiguity in a short time with a reduced possibility of errors.

SUMMARY OF THE INVENTION

In light of the aforementioned problems of the prior art, it is an object of the invention to provide a carrier-phase-based relative positioning device employing a signal processing method which makes it possible to continue estimation of integer ambiguity values even when the number of GPS satellites (positioning satellites) has changed, determine a true integer ambiguity value by efficiently verifying the integer ambiguities in a short time, and calculate a baseline vector.

According to the invention, a carrier-phase-based relative positioning device comprises means for estimating an integer ambiguity and a baseline vector and means for verifying the integer ambiguity, wherein a new integer ambiguity is estimated from the previously estimated baseline vector or integer ambiguity when the number of positioning satellites has changed or when a positioning satellite used as a reference (reference satellite) has been switched. When the number of positioning satellites has changed or when the reference satellite has been switched, the positioning device thus constructed can continue estimation of the integer ambiguity using the integer ambiguity or the baseline vector which has so far been determined without the need to estimate the integer ambiguity from the beginning. Accordingly, it becomes unnecessary to newly estimate the integer ambiguity from a single or double phase difference so that the integer ambiguity can be quickly determined with ease.

In one feature of the invention, when the number of positioning satellites has increased, the new integer ambiguity is estimated from the baseline vector estimated before the number of positioning satellites has increased. With this arrangement, the positioning device can continue estimation of the integer ambiguity without interrupting estimation process carried out up to the point of change in the number of positioning satellites, using also radio waves received from a newly observed positioning satellite. Thus, the positioning device can easily and uninterruptedly estimate the integer ambiguity even when the number of positioning satellites has increased.

In another feature of the invention, when the number of positioning satellites has decreased, the new integer ambiguity is estimated by removing an estimated value of the integer ambiguity derived from the positioning satellite which has become unobservable. With this arrangement, the positioning device can continue estimation of the integer ambiguity without interrupting estimation process carried out up to the point of change in the number of positioning satellites, excluding information derived from the positioning satellite which has become unobservable. Thus, the positioning device can easily and uninterruptedly estimate the integer ambiguity even when the number of positioning satellites has decreased.

In another feature of the invention, a double phase difference is used for estimating the integer ambiguity and, when the reference antenna has been switched, the integer ambiguity after the switching of the reference antenna is estimated by using a difference operation method for calculating the integer ambiguity and the baseline vector in response to the reference antenna switching. This arrangement makes it possible to easily estimate the integer ambiguity by reference to the baseline vector obtained immediately before reference antenna switching.

In another feature of the invention, the means for verifying and determining the integer ambiguity determines the integer ambiguity when the reliability of the integer ambiguity has been verified a specific number of times from its successively detected estimated values. With this arrangement, the number of times the same estimated value of the integer ambiguity recurs is counted to ascertain the reliability of the determined integer ambiguity with high accuracy.

In another feature of the invention, the means for verifying and determining the integer ambiguity determines the integer ambiguity when the same estimated value of the integer ambiguity has been successively detected a specific number of times. With this arrangement, the number of times the same estimated value of the integer ambiguity recurs successively is counted to ascertain the reliability of the determined integer ambiguity with higher accuracy.

In still another feature of the invention, the positioning device uses a Kalman filter for estimating a floating ambiguity and the baseline vector from which the integer ambiguity is determined. This arrangement makes it possible to simultaneously estimate and calculate the floating ambiguity and the baseline vector with improved reliability.

In yet another feature of the invention, the means for estimating and determining candidates of the integer ambiguity based on the floating ambiguity uses lambda notation. This arrangement makes it possible to easily estimate and calculate the integer ambiguity with improved reliability.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

First, a carrier-phase-based relative positioning device according to a first embodiment of the invention is described with reference to FIGS. 1 to 3.

Figure 1:
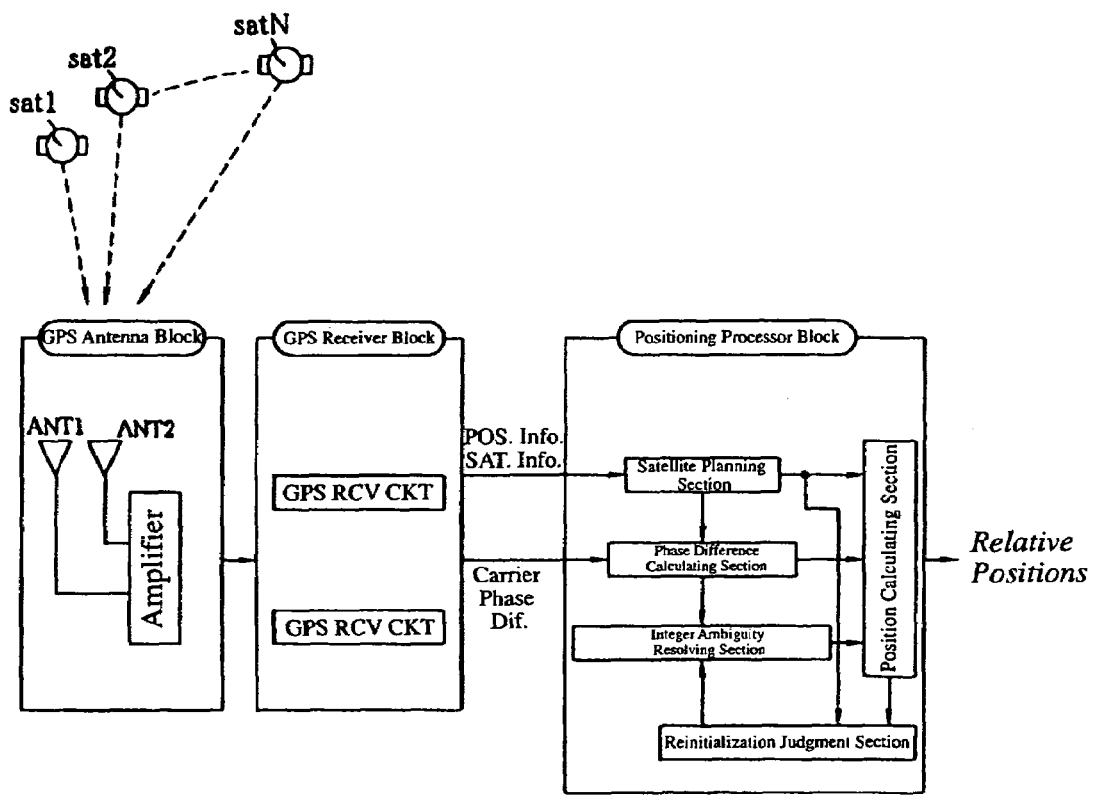
FIG. 1 is a block diagram of a carrier-phase-based relative positioning device according to a first embodiment of the invention.

FIG. 1 is a block diagram of the carrier-phase-based relative positioning device of the first embodiment, in which designated by the symbols sat1, sat2 and satN are GPS satellites (positioning satellites).

A GPS antenna block including two antennas ANT1, ANT2 receives waves transmitted from the GPS satellites sat1, sat2, satN, downcoverts received signals into intermediate frequency (IF) signals. The IF signals are amplified by an amplifier built in the GPS antenna block and delivered to the GPS receiver block.

Based on the signals received by the individual antennas ANT1, ANT2, the GPS receiver block calculates the positions of the antennas ANT1, ANT2 and carrier phase differences, and sends these data together with information on the individual GPS satellites sat1, sat2, satN to a positioning processor block at specific time intervals (a few tens of milliseconds to a few seconds).

The positioning processor block includes a satellite planning section, a phase difference calculating section, an integer ambiguity resolving section, a position calculating section and a reinitialization judgment section.

The satellite planning section selects positioning satellites to be used for positioning based on ephemeris information and antenna position information and gives information on the positions of the selected positioning satellites and on the positioning satellites themselves to the phase difference calculating section.

The phase difference calculating section calculates observables of single or double phase differences from the information received from the satellite planning section and from a carrier phase difference signal received from the GPS receiver block and delivers resultant phase difference information to the integer ambiguity resolving section.

The integer ambiguity resolving section determines integer ambiguities of the single or double phase differences using a Kalman filter and lambda notation and delivers integer ambiguity information to the position calculating section. The Kalman filter calculates estimated values of floating ambiguities and baseline vectors, and estimated values of the integer ambiguities are calculated based on the floating ambiguities using the lambda notation. The integer ambiguities thus calculated are verified and sent to the position calculating section.

The position calculating section calculates relative positions of the antennas ANT1, ANT2 based on the satellite information given from the satellite planning section, the phase difference information given from the phase difference calculating section and the integer ambiguities and the baseline vectors given from the integer ambiguity resolving section.

In the aforementioned process, the floating ambiguities and the baseline vectors are simultaneously verified by mathematical operation using the Kalman filter.

The reinitialization judgment section verifies the integer ambiguities already determined at a given point in time.

Next, a method of calculating the floating ambiguities by the Kalman filter is described.

A linear discrete probability system is employed for estimating the floating ambiguities and the baseline vectors using the Kalman filter. The linear discrete probability system is made up of an observation system and a dynamic system which are given by the following equations, respectively:

Observation System $$Y_k = H_k x_k + v_k \quad (1)$$

Dynamic System $$x_{k+1} = \Phi_k x_k + D_k u_k + G_k w_k \quad (2)$$

where $x_k$ is a state vector, $u_k$ is a control input vector, $y_k$ is a observable vector, $w_k$ is system noise, $v_k$ is observation noise, $\Phi_k$ is a state transition matrix, $D_k$ is a control input matrix and $H_k$ is an observable matrix.

When the observables are double phase differences, the observable vector $Y_k$ is a double phase difference, the state vector $X_k$ and the observable matrix $H_k$ are expressed as:

$$x_k = \begin{bmatrix} b_k \\ a_k \end{bmatrix}, H_k = [B_k, A_k] \quad (3)$$

respectively, where $B_k$ is a direction cosine matrix, $b_k$ is a baseline vector, $A_k$ is a quantity equal to wavelength times a unit matrix and $a_k$ is a floating ambiguity. The direction cosine matrix $B_k$ can be calculated from a single measurement and the quantity wavelength times the unit matrix $A_k$ is a fixed value calculated from the wavelength of the carrier.

Substituting these values in a filter equation, $y_k$ is expressed as follows:

$$y_k = [B_k, A_k] \begin{bmatrix} b_k \\ a_k \end{bmatrix} + v_k = B_k b_k + A_k a_k + v_k \quad (4)$$

If the distance is expressed in terms of wavelengths times the unit matrix, $A_k$ can be replaced by a unit matrix I. Thus equation (4) can be rewritten in a simplified form shown below:

$$y_k = [B_k, I] \begin{bmatrix} b_k \\ a_k \end{bmatrix} + v_k = B_k b_k + a_k + v_k \quad (5)$$

The aforementioned dynamic system is now described assuming a situation in which a unit vector $b_k$ at time k and a unit vector $b_{k+1}$ at time k+1 are approximately same to each other.

(a) When there is no change in the number of positioning satellites or in the positioning satellite used as a reference (reference satellite)

In a case where there is no change in reference satellite information, neither the baseline vector $b_k$ nor the floating ambiguity $a_k$ changes. Therefore, the dynamic system can be expressed by equation (6) below:

$$\begin{bmatrix} b_{k+1} \\ a_{k+1} \end{bmatrix} = \begin{bmatrix} I & O \\ O & I \end{bmatrix} \begin{bmatrix} b_k \\ a_k \end{bmatrix} + \begin{bmatrix} w_{bk} \\ w_{ak} \end{bmatrix} \quad (6)$$

which is the result of substituting the following equation into equation (2) which expresses the dynamic system:

$$x_k = \begin{bmatrix} b_{k+1} \\ a_{k+1} \end{bmatrix}, \Phi_k = \begin{bmatrix} I & O \\ O & I \end{bmatrix}, \quad (7)$$

$$D_k = I, u_k = 0, G_k = I, w_k = \begin{bmatrix} w_{bk} \\ w_{ak} \end{bmatrix}$$

(b) When there are changes in the number of positioning satellites and in the reference satellite In a case where there is a change in the reference satellite information, the floating ambiguity $a_k$ varies although the baseline vector $b_k$ does not vary. As it is impossible to estimate floating ambiguity $a_{k+1}$ from the floating ambiguity $a_k$ in this case, the former is estimated by a method described below.

Because the baseline vector $b_k$, $b_{k+1}$ does not vary with time, baseline vector $b_{k+1}$ can be expressed as follows using part of equation (6) related to the baseline vector $b_k$:

$$b_{k+1} = b_k + w_{bk} \tag{8}$$

Also, from equation (5), the floating ambiguity $a_{k+1}$ is obtained as follows:

$$y_{k+1} = B_{k+1}b_{k+1} + a_{k+1} + v_{k+1}$$

$$a_{k+1} = y_{k+1} - B_{k+1}b_{k+1} - v_{k+1} \tag{9}$$

Thus, the dynamic system can be expressed by equation (10) below:

$$\begin{bmatrix} b_{k+1} \\ a_{k+1} \end{bmatrix} = \begin{bmatrix} I & O \\ -B_{k+1} & O \end{bmatrix} \begin{bmatrix} b_k \\ a_k \end{bmatrix} + \begin{bmatrix} o \\ y_{k+1} \end{bmatrix} + \begin{bmatrix} w_{bk} \\ w_{ak} - v_{k+1} \end{bmatrix} \tag{10}$$

which is the result of substituting the following equation into equation (2) which expresses the dynamic system:

$$x_{k+1} = \begin{bmatrix} b_{k+1} \\ a_{k+1} \end{bmatrix}, \Phi_k = \begin{bmatrix} I & O \\ -B_{k+1} & O \end{bmatrix}, \tag{11}$$

$$D_k = I, u_k = 0, G_k = I, w_k = \begin{bmatrix} w_{bk} \\ w_{ak} - v_{k+1} \end{bmatrix}$$

It is possible to use the Kalman filter for obtaining the baseline vector and floating ambiguity using double phase differences as observables as seen above.

Next, the observation noise $v_k$ and the system noise $w_k$ are determined to resolve this equation. To use the Kalman filter, we need a covariance matrix $R_k$ of the observation noise $v_k$ and a covariance matrix $Q_k$ of the system noise $w_k$. Here, the observation noise $v_k$, the system noise $w_k$, the covariance matrix $R_k$ and the covariance matrix $Q_k$ should satisfy the following conditions:

$$E[w_k] = 0, E[w_k w_j^T] = Q_k \delta_{kj}, E[w_k v_j^T] = 0 \tag{12}$$

$$E[v_k] = 0, E[v_k v_j^T] = R_k \delta_{kj}, E[v_k w_j^T] = 0$$

$$E[w_k x_j^T] = 0, E[v_k x_j^T] = 0, k \geq j$$

where $E[*]$ represents averaging operation of each vector and matrix and $\delta_{kj}$ is a Kronecker's delta.

As equations (4), (6) and (10) satisfy the set of equations (12) above, the individual covariance matrices $R_k$, $Q_k$ should be calculated to determine the observation noise $v_k$ and the system noise $w_k$.

Since an observable of the observation noise $v_k$ is a double phase difference, the observation noise $v_k$ corresponds to observation noise expressed by a double phase difference, which can be obtained by the following procedure.

First, the baseline vector $b_k$ is measured with the carrier-phase-based relative positioning device held at a fixed location and, then a double phase difference and a direction cosine difference matrix are determined. Using these data and assuming that the double phase difference calculated from the measured baseline vector $b_k$ and the direction cosine difference matrix is a true value, the difference between that value and the double phase difference calculated from radio wave information received from positioning satellites is calculated. Since the observation noise $v_k$ expressed in terms of the double phase difference is sufficiently small compared with the wavelength of the carrier, the observation noise $v_k$ can be regarded as a fractional part of the double phase difference expressed in terms of the number of carrier wave cycles. Thus, the variance of this fractional part is calculated and a matrix of which diagonal elements are variance values is used as the covariance matrix $R_k$ of the observation noise $v_k$.

The system noise $w_k$ should be discussed taking into consideration two cases, that is, the case where there is no change in the positioning satellites and the case where there is a change in the positioning satellites as shown by equations (6) and (10), respectively.

(a) When there is no change in positioning satellites

There are two types of system noises $w_{ak}$ and $w_{bk}$ in the system noise $w_k$ as shown in equations (6). Since $w_{ak}$ and $w_{bk}$ are not correlated with each other, the covariance matrix $Q_k$ of the system noise $w_k$ can be expressed as follows:

$$Q_k = \begin{bmatrix} Q_{bk} & 0 \\ 0 & Q_{ak} \end{bmatrix} \tag{13}$$

where $Q_{ak}$ is a covariance matrix of $w_{ak}$ and $Q_{bk}$ is a covariance matrix of $W_{bk}$.

Because the baseline vector $b_k$ at the time k and the baseline vector $b_{k+1}$ at the time k+1 are same as previously mentioned, the system noise $w_{bk}$ is always 0 when the two antennas ANT1, ANT2 for measuring double phase differences are fixed. If one of the antennas ANT1, ANT2 is installed on a mobile vehicle, the system noise $w_{bk}$ can be determined according to variations in the baseline vector between the time k and the time k+1. As an example, if the speed of the mobile vehicle is known although the direction of its movement is unknown, the system noise $w_{bk}$ is determined according to the value of the speed times elapsed time.

Similarly, the floating ambiguity does not vary with time and the system noise $w_{ak}$ is an error of the floating ambiguity, so that the system noise $w_{ak}$ can also be regarded as 0. Therefore, system noise $W_{bk}$ is also a zero matrix.

(b) When there is a change in positioning satellites

The covariance matrix $Q_{bk}$ of the system noise $w_{bk}$ and s is same as in the aforementioned case (a), since there is no change in the baseline vector $b_k$. The value $w_{ak}-v_{k+1}$ has an error equal to $v_{k+1}$ which is an error of the observation noise $v_k$. Therefore, as in the case of the aforementioned observation error $v_k$, the covariance matrix $Q_{bk}$ can be calculated as a covariance matrix $Q'_{ak}$ of $w_{ak}-v_{k+1}$.

Thus, the covariance matrix $Q_k$ of the system noise $w_k$ can be expressed as follows:

$$Q_k = \begin{bmatrix} Q_{bk} & 0 \\ 0 & Q'_{ak} \end{bmatrix} \tag{14}$$

It is necessary to specify initial conditions to perform the aforementioned mathematical operation by the Kalman filter. The initial conditions include initial values of the baseline vector and the floating ambiguity as well as their covariance matrices. These initial values and covariance matrices are calculated from results of independent measurements obtained by using code information of the individual positioning satellites. The independent measurements enable calculation of position fixes with each of the antennas ANT1, ANT2 alone, separately from relative positioning using the carrier phase, so that the individual initial values and covariance matrices can be calculated from the results of the independent measurements.

Figure 2:
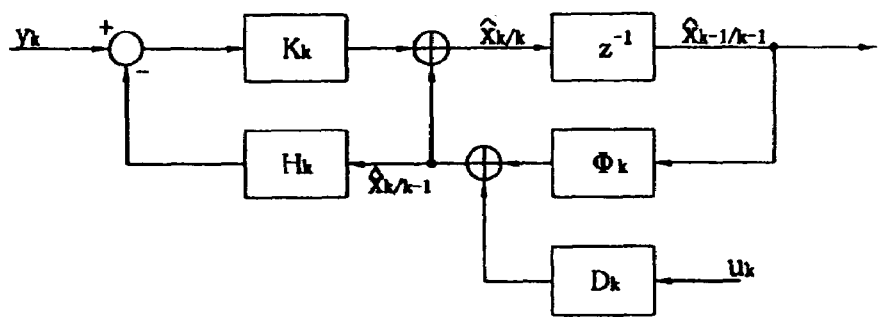
FIG. 2 is a block diagram showing mathematical operation performed by a Kalman filter.
Figure 3:
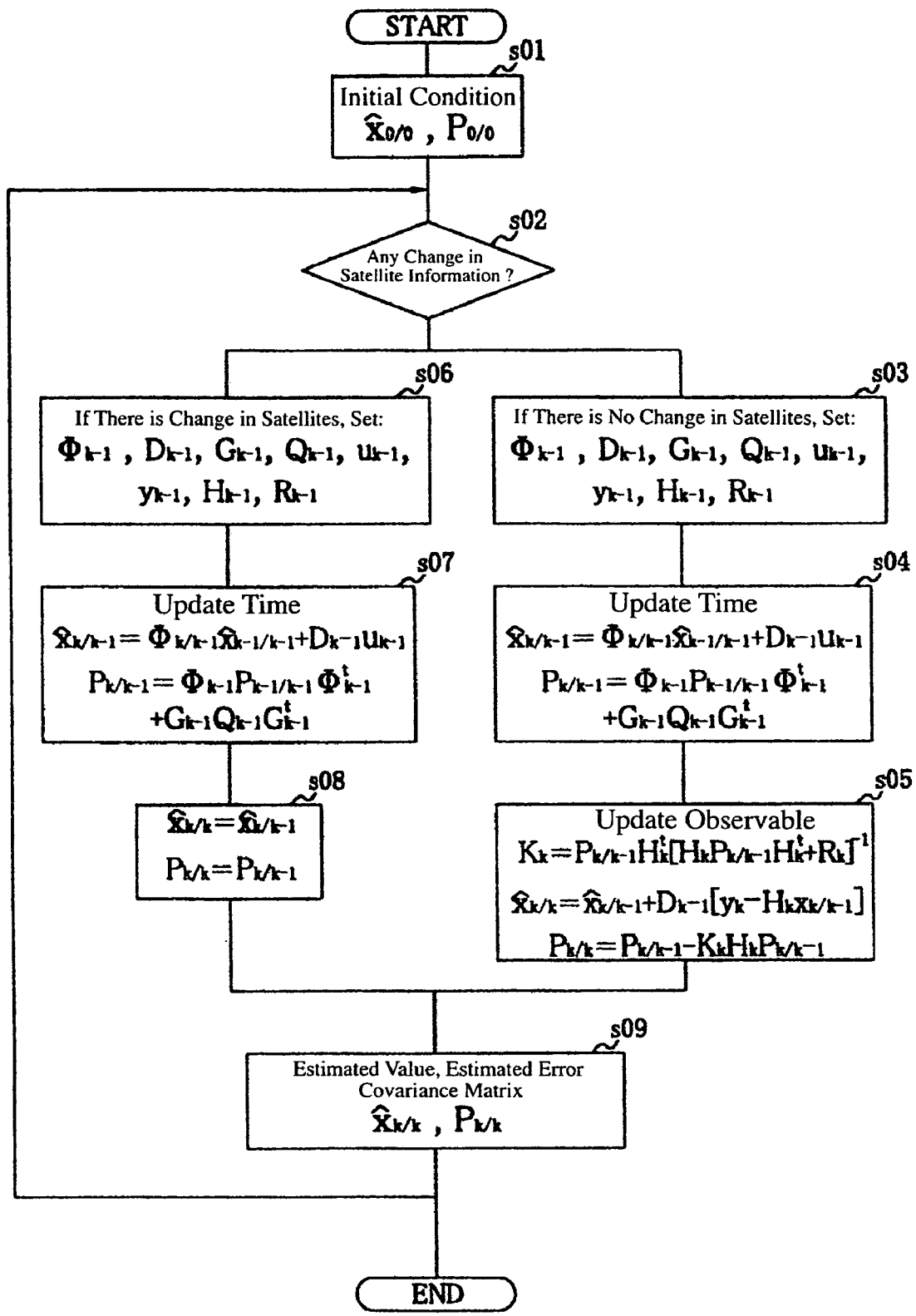
FIG. 3 is a flowchart showing the mathematical operation performed by the Kalman filter.

Referring now to FIGS. 2 and 3, a procedure of mathematical operation performed by the Kalman filter is explained.

FIG. 2 is a block diagram showing the mathematical operation performed by the Kalman filter, and FIG. 3 is a flowchart of the mathematical operation.

The block diagram of FIG. 2 can be rewritten as follows in the form of filter equations:

$$\hat{X}_{k+1/k} = \Phi_k \hat{X}_{k/k} + D_k u_k$$

$$\hat{x}_{k/k} = \hat{x}_{k/k-1} + K_k [y_k - H_k \hat{x}_{k/k-1}] \quad (15)$$

where $K_k$ is a matrix representing filter gain which can be expressed as follows:

$$K_k = P_{k/k-1} H_k^t [H_k P_{k/k-1} H_k^t + R_k]^{-1} \quad (16)$$

where $P_{k/k-1}$ is a covariance matrix which is obtained from the following equations:

$$P_{k+1/k} = \Phi_k P_{k/k} \Phi_k^t + G_k Q_k G_k^t$$

$$P_{k/k} = P_{k/k-1} - K_k H_k P_{k/k-1} \quad (17)$$

Also, the initial conditions can be expressed as follows:

$$\hat{x}_{0/-1} = E[x_0] P_{0/-1} = E[(x_0 - \bar{x}_0)(x_0 - \bar{x}_0)'] \quad (18)$$

The aforementioned operation flow of the Kalman filter is now described referring to the flowchart of FIG. 3.

First, the initial conditions (an estimated value of $x_{0/0}$ and its covariance matrix $P_{0/0}$) are determined based on the independent measurements obtained with the individual antennas ANT1, ANT2 (step S01). Next, a judgment is made to determine whether there is any change in the satellite information or not (step S02).

If there is no change in the satellite information, individual vectors and matrices are obtained from observations or particular vectors and matrices are set and time is updated using the filter equation (15) and covariance equation (17) (step S04). After updating the time, an estimated value of a state vector $x_{k/k}$ and its estimated covariance matrix $P_{k/k}$ are determined using the double phase difference $y_k$ which is an observable as well as the filter equation (15), covariance equation (17) and equation (16) representing the filter gain (steps S05 to S09).

If there is a change in the satellite information, on the other hand, time is updated in the same manner as in the case of no change in the satellite information and, using the state vector and covariance equation obtained before the change, a new state vector $x_{k/k}$ is estimated and an estimated covariance matrix $P_{k/k}$ is calculated (steps S06 to S09).

When a single solution of the state vector has been obtained after repeatedly and time-sequentially executing the aforementioned mathematical operation, candidates of the state vector to be taken as the baseline vector and of floating ambiguities are determined.

Candidates of the potentially true integer ambiguity are calculated based on the floating ambiguities thus estimated using the lambda notation. In the lambda notation, the candidates of the potentially true integer ambiguity are calculated as follows:

$$(a-\alpha)^t \cdot Q_\alpha^{-1} \cdot (a-\alpha) \leq x^2 \quad (19)$$

where a is a candidate of the potentially true integer ambiguity, $\alpha$ is a floating ambiguity, $Q_\alpha^{-1}$ is a variance-covariance matrix and $x^2$ is the threshold of a norm.

Specifically, each candidate a of the potentially true integer ambiguity is substituted in the inequality (19) which uses the floating ambiguity a and the variance-covariance matrix $Q_\alpha^{-1}$ of the floating ambiguity. If the calculated value of the left side of the inequality (19) is equal to or smaller than the threshold $x^2$ of the norm, the candidate a of the potentially true integer ambiguity is regarded as true and the result is calculated, in which the threshold $x^2$ of the norm is set according to search volume in the actual positioning device.

It is possible to obtain an integer ambiguity yet more precisely by generating candidates of the potentially true integer ambiguity using the lambda notation as seen above.

While the lambda notation is used for generating candidates of the potentially true integer ambiguity in the present embodiment, any of other appropriate methods may be used for calculating candidates of the potentially true integer ambiguity from floating ambiguities. One of the simplest methods would be, for example, to round off the fractional part of the floating ambiguity. Although this alternative approach would give poorer accuracy, it should help increase processing speed.

Figure 4:
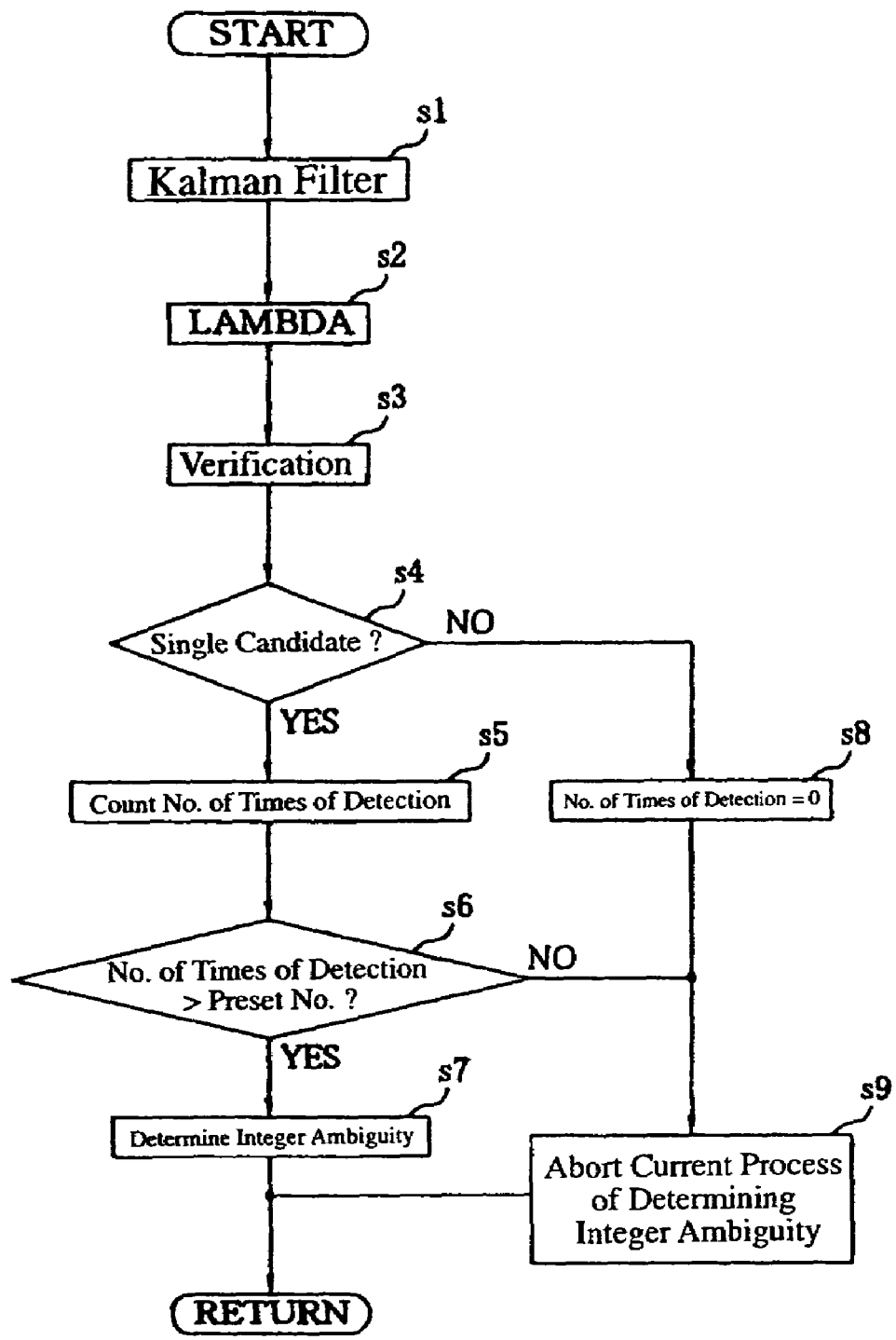
FIG. 4 is a flowchart showing operation for determining an integer ambiguity.
Figure 5:
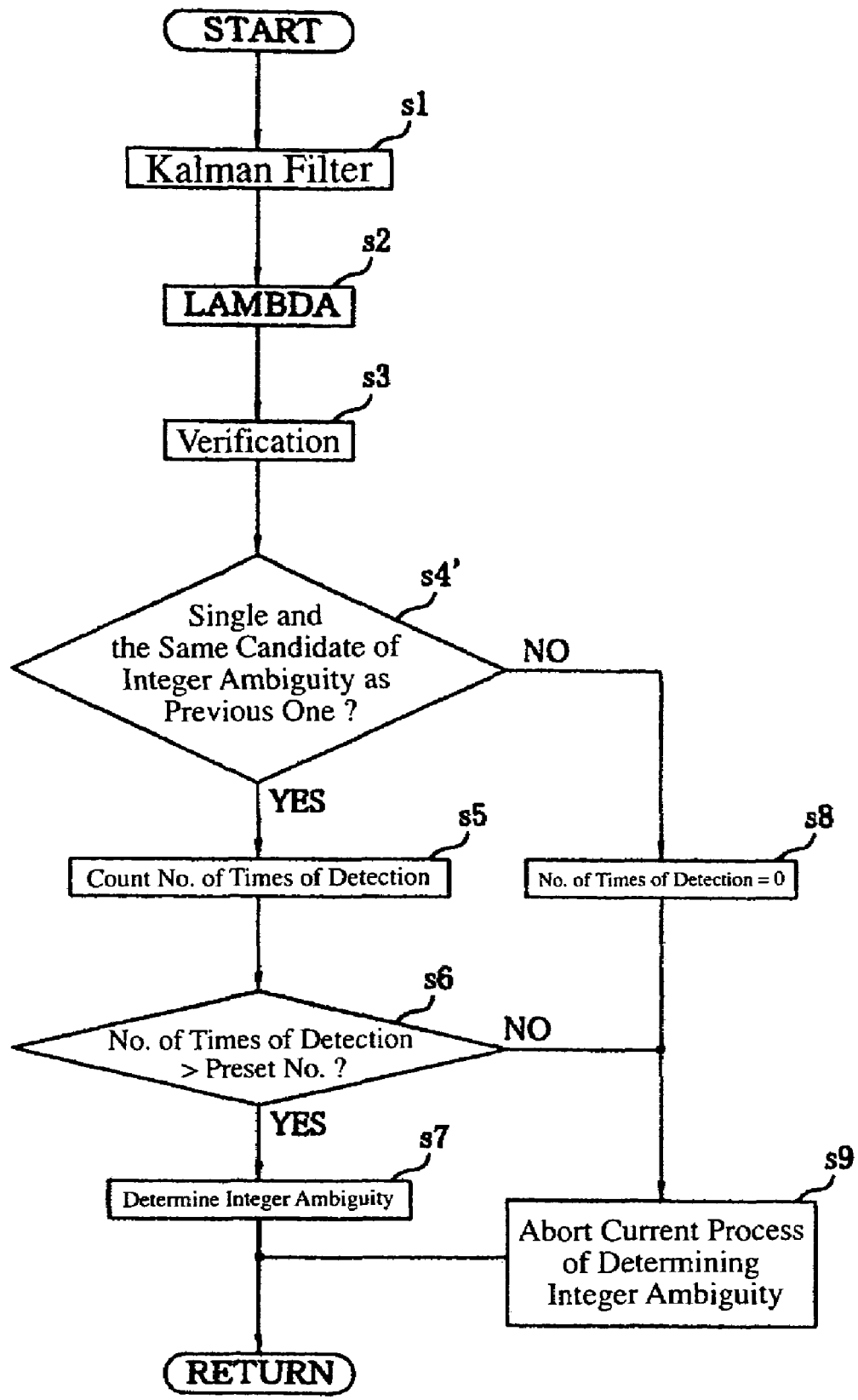
FIG. 5 is a flowchart showing operation for determining an integer ambiguity using an alternative verification method.

Next, a method of verification is described referring to FIGS. 4 and 5. FIG. 4 is a flowchart showing operation for determining the integer ambiguity.

Upon receiving various observables mentioned above, the positioning device estimates floating ambiguities by using the Kalman filter and generates candidates of the potentially true integer ambiguity by using the lambda notation as shown in FIG. 4 (steps S1 and S2). The candidates of the potentially true integer ambiguity thus obtained are subjected to various forms of verification and a candidate of the potentially true integer ambiguity that is considered most reliable at a particular point in time is calculated (steps S3 and S4), where the forms of verification include (1) verification by the baseline vector, (2) verification by the residual sum of squares, and (3) verification by the inner product.

If only one candidate of the potentially true integer ambiguity is obtained, the number of times that the particular candidate having the same value occurs is counted by reference to the repeatedly and time-sequentially calculated candidates of the potentially true integer ambiguity (step S5). When the count value, or the number of times the particular candidate of the same value is detected, exceeds a preset value (number of times), the same candidate is determined as the integer ambiguity (steps S6 and S7).

If the number of candidates of the potentially true integer ambiguity is not one in step S4, the number of times the particular candidate of the integer ambiguity is detected is regarded as 0 and a current process of determining the integer ambiguity is aborted at that point in time (steps S8 and S9). When the number of times the particular candidate of the same value is detected does not exceed the preset value in step S6, the current process of determining the integer ambiguity is also aborted at that point in time (step S9). In such cases, the integer ambiguity is estimated again by using the Kalman filter and the lambda notation.

It is possible to determine the integer ambiguity in a reliable fashion and lessen the possibility of determining on a wrong integer ambiguity by estimating and verifying candidates of the potentially true integer ambiguity by the aforementioned method.

An alternative method of verification is now described referring to FIG. 5, which is a flowchart showing operation for determining an integer ambiguity using the alternative verification method.

According to the verification method shown in FIG. 5, if only one candidate of the potentially true integer ambiguity is obtained, the number of times that the particular candidate having the same value successively occurs is counted by reference to the repeatedly and time-sequentially calculated candidates of the potentially true integer ambiguity (steps S4' and S5). The operation flow of FIG. 5 is otherwise same as that of the verification method shown in FIG. 4.

It is possible to determine the integer ambiguity in a more reliable fashion by estimating and verifying candidates of the potentially true integer ambiguity by the aforementioned method than by the method of FIG. 4, whereby the possibility of determining on a wrong integer ambiguity can be further reduced.

Because the verification method shown in FIG. 5 is more stringent than that shown in FIG. 4 in terms of conditions for resolving the integer ambiguity, the verification method of FIG. 5 requires a longer time for determining the integer ambiguity, although it helps improve the reliability of the resolved integer ambiguity. In other words, there is always a trade-off between the reliability of the resolved integer ambiguity and the time required for determining the integer ambiguity. As higher priority is placed on the reliability of the resolved integer ambiguity in currently available systems, it is possible to reliably determine the integer ambiguity by using the verification method of FIG. 5 although it requires a longer measurement time. Even with the verification method of FIG. 4, it is possible to ensure sufficiently high reliability of the resolved integer ambiguity compared to reliability achievable with the prior art, because the verification method of FIG. 4 verifies the integer ambiguity not only by simply examining it but also by repeatedly examining the result of verification.

It is difficult to use the verification method shown in FIG. 5 in a case where there is a change in the satellite information. This is because the integer ambiguity can not be resolved unless estimated values (candidates) of the integer ambiguity successively take the same value in the verification method of FIG. 5. More specifically, when the number of positioning satellites has increased or decreased, or when the reference satellite is altered, the estimated value of the integer ambiguity could more or less vary, because the integer ambiguity is estimated based on the baseline vector. Therefore, it becomes difficult to determine the integer ambiguity when there is a change in the satellite information.

In such cases, the integer ambiguity can be determined more efficiently by using the verification method of FIG. 4.

Next, the configuration of a carrier-phase-based relative positioning device according to a second embodiment of the invention is described.

(1) When the number of positioning satellites increases

In this case, floating ambiguities and baseline vectors are estimated using the same method as in the first embodiment.

(2) When the number of positioning satellites decreases

In this case, the filter equation is expressed as follows:

$$\begin{bmatrix} b_{k+1} \\ a_{k+1} \end{bmatrix} = \begin{bmatrix} I & O \\ O & T_1 \end{bmatrix} \begin{bmatrix} b_k \\ a_k \end{bmatrix} + \begin{bmatrix} w_{bk} \\ w_{ak} \end{bmatrix} \quad (20)$$

where $T_1$ is a matrix obtained by multiplying a row of a unit matrix I corresponding to a positioning satellite which has become unobservable by 0. As an example, when one (corresponding to the third row) of 12 positioning satellites which could be observed becomes unobservable, the matrix $T_1$ is expressed as follows, wherein every element of the third row of the unit matrix is multiplied by 0.

$$T_1 = \begin{bmatrix} 1 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 1 \end{bmatrix} \quad (21)$$

It is possible to eliminate information from the positioning satellite which has become unobservable by using the filter equation shown above and, then, floating ambiguities can estimated again under conditions where the number of positioning satellites has decreased.

(3) When the reference satellite has changed

When the reference satellite is switched from an ith positioning satellite to a jth positioning satellite, for example, the double phase difference taken from a kth positioning satellite can be replaced as follows by performing a difference operation method shown below.

In a case where the ith positioning satellite has been the previous reference satellite, the double phase difference taken from the kth positioning satellite can be expressed as $$\nabla \Delta \phi_{ki} = \Delta \phi_k - \Delta \phi_i \quad (22)$$

and the double phase difference taken from the jth positioning satellite can be expressed as $$\nabla \Delta \phi_{ji} = \Delta \phi_j - \Delta \phi_i \quad (23)$$

where $\Delta \phi_i$, $\Delta \phi_j$ and $\Delta \phi_k$ are single phase differences obtained from the individual positioning satellites and $\nabla \Delta \phi_{ki}$ and $\nabla \Delta \phi_{ji}$ are the double phase differences.

Subtracting the right side of equation (23) from the right side of equation (22), $$\nabla \Delta \phi_{kj} = \Delta \phi_k - \Delta \phi_j \quad (24)$$

which represents the double phase difference (left side of equation (24)) of the kth positioning satellite referenced to the jth positioning satellite.

Using the result of difference operation shown above, the filter equation applicable when the reference satellite is altered can be expressed as follows:

$$\begin{bmatrix} b_{k+1} \\ a_{k+1} \end{bmatrix} = \begin{bmatrix} I & O \\ O & T_2 \end{bmatrix} \begin{bmatrix} b_k \\ a_k \end{bmatrix} + \begin{bmatrix} w_{bk} \\ w_{ak} \end{bmatrix} \quad (25)$$

where $T_2$ is a matrix obtained by subtracting 1 from all elements of a row of the unit matrix I corresponding to a positioning satellite which has been-newly chosen as the reference satellite and multiplying a row of the unit matrix I corresponding to a positioning satellite which has become unobservable by 0. A situation in which the reference satellite is altered and the number of observable positioning satellites decreases at the same time is taken into account in the above equation.

Provided that there are 12 positioning satellites observed at least at one of measurement epochs k and k+1, the reference satellite has been switched to a positioning satellite corresponding to the third row of the matrix, and the positioning satellites corresponding to the seventh and ninth to twelfth rows have been observed at only one of the measurement epochs k and k+1, for example, the matrix $T_2$ is expressed as follows:

$$T_2 = \begin{bmatrix} 1 & 0 & -1 & 0 & 0 & 0 & 0 & 0 & 0 & 0 & 0 & 0 \\ 0 & 1 & -1 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & -1 & 1 & 0 & 0 & 0 & 0 & 0 & 0 & 0 & 0 \\ 0 & 0 & -1 & 0 & 1 & 0 & 0 & 0 & 0 & 0 & 0 & 0 \\ 0 & 0 & -1 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & -1 & 0 & 0 & 0 & 0 & 1 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \end{bmatrix} \quad (26)$$

It is possible to easily estimate floating ambiguities and baseline vectors by setting the filter equation as shown above even when a change has occurred in the satellite information.

Next, the configuration of a carrier-phase-based relative positioning device according to a third embodiment of the invention is described.

While the aforementioned first and second embodiments employ the Kalman filter for estimating only the baseline vector $b_k$ and the floating ambiguity $a_k$, the third embodiment employs a Kalman filter capable of estimating not only the baseline vector $b_k$ and the floating ambiguity $a_k$ but also a multipath error $v_k$, which is observation noise, at the same time.

In this case, the filter equation representing time update is expressed as follows:

(1) When there is no change in the satellite information $$\begin{bmatrix} b_{k+1} \\ a_{k+1} \\ v_{k+1} \end{bmatrix} = \begin{bmatrix} B_{k+1}^+ & O & \alpha B_{k+1}^+ \\ O & I & O \\ O & O & (1-\alpha)I \end{bmatrix} \begin{bmatrix} b_k \\ a_k \\ v_k \end{bmatrix} + \begin{bmatrix} B_{k+1}^+(y_{k+1} - y_k) \\ o \\ o \end{bmatrix} + \begin{bmatrix} w_{bk} \\ w_{ak} \\ w_{vk} \end{bmatrix} \quad (27)$$

where $B_{k+1}^+ = (B_{k+1}{}^t B_{k+1})^{-1} B_{k+1}{}^t$ and $\alpha$ is a constant representing a property of multipath errors.

Mathematical operation of this filter equation can be performed in the same fashion as in the foregoing embodiments to estimate the baseline vector $b_k$, floating ambiguity $a_k$ and multipath error $v_k$.

(2) When there is a change in the satellite information $$\begin{bmatrix} b_{k+1} \\ a_{k+1} \\ v_{k+1} \end{bmatrix} = \begin{bmatrix} B'^{+}_{k+1} B'_k & O_{3*12} & \alpha B'^{+}_{k+1} T_3 \\ B_{k+1} B'^{+}_{k+1} B'_k & O_{12*12} & -(1-\alpha+\alpha B'^{+}_{k+1})T_3 \\ O_{12*3} & O_{12*12} & (1-\alpha)T_3 \end{bmatrix} \begin{bmatrix} b_k \\ a_k \\ v_k \end{bmatrix} +$$

$$\begin{bmatrix} B'^{+}_{k+1}(y'_{k+1} - y'_k) \\ -B_{k+1} B'^{+}_{k+1}(y'_{k+1} - y'_k) + y_{k+1} \\ o \end{bmatrix} + \begin{bmatrix} w'_{bk} \\ w'_{ak} \\ w'_{vk} \end{bmatrix} \quad (28)$$

where $B'^{+}_{k+1} = (B'_{k+1}{}^t B'_{k+1})^{-1} B'_{k+1}{}^t$ and $\alpha$ is a constant representing a property of multipath errors.

A time difference $(y'_{k+1} - y'_k)$ between double phase differences used for updating the time of the baseline vector $b_k$ is calculated as follows.

(a) When the reference satellite is switched

Since the baseline vector $b_{k+1}$ after switching of the reference satellite does not significantly vary from the baseline vector $b_k$ before the switching of the reference satellite, a double phase difference at the epoch k is recalculated by using the reference satellite (new reference satellite) at the epoch k+1. Also, additional conditions are added such that a positioning satellite newly observed at the epoch k+1 would not be specified as the reference satellite.

(b) When the number of positioning satellites increases or decreases

In this case, only such double phase differences that can be observed at both the epochs k and k+1 are used.

This operation is similarly performed on the direction cosine matrix $B'_k$ as well.

A matrix $T_3$ representing conversion of an estimated value of the multipath error $v_k$ occurring when there is a change in the satellite information is generated as described below.

In the unit matrix I, 1 is subtracted from all elements in a column corresponding to a newly specified reference satellite and 0 is multiplied to all elements in each row corresponding to a positioning satellite which is not observed at either the epoch k or k+1. This matrix $T_3$ has the same rows and columns as the aforementioned matrix $T_2$.

As a consequence, it is possible to switch the matrix corresponding to the aforementioned reference satellite and eliminate the influence of positioning satellites which are not observed. This Kalman filter also makes it possible to estimate the baseline vector $b_k$ and candidates of the floating ambiguity $a_k$ by the aforementioned mathematical operation.

The configuration of a carrier-phase-based relative positioning device according to a fourth embodiment of the, invention is now described.

While the Kalman filter of the third embodiment estimates the floating ambiguity $a_k$ from the baseline vector $b_k$ when a change occurs in the satellite information, the fourth embodiment employs a Kalman filter which estimates the floating ambiguity $a_{k+1}$ after a change in the satellite information from the floating ambiguity $a_k$ obtained before the change when the number of observable positioning satellites has decreased or the reference satellite has changed.

When there is no change in the satellite information of positioning satellites or when the number of positioning satellites has increased, the same filter equation as shown in the third embodiment is applied. When the number of positioning satellites has decreased or when the reference satellite has changed, however, the baseline vector $b_k$, the floating ambiguity $a_k$ and the multipath error $v_k$ can be estimated by using filter equations shown below.

(1) When the number of positioning satellites has decreased $$\begin{bmatrix} b_{k+1} \\ a_{k+1} \\ v_{k+1} \end{bmatrix} = \begin{bmatrix} B'^+_{k+1}B'_k & 0 & \alpha B'^+_{k+1}T_4 \\ 0 & T_4 & 0 \\ 0 & 0 & (1-\alpha)T_4 \end{bmatrix} \begin{bmatrix} b_k \\ a_k \\ v_k \end{bmatrix} + \begin{bmatrix} B'^+_{k+1}(y'_{k+1} - y'_k) \\ 0 \\ 0 \end{bmatrix} + \begin{bmatrix} w''_{bk} \\ w''_{ak} \\ w''_{vk} \end{bmatrix}$$ (29)

where $B'^+_{k+1} = (B'^t_{k+1} B'_{k+1})^{-1} B'^t_{k+1}$, $\alpha$ is a constant representing a property of multipath errors, and $T_4$ is a matrix (having the same configuration as the matrix $T_1$) obtained by multiplying elements of a row of the unit matrix I corresponding to a positioning satellite which become unobservable by 0.

(2) When the reference satellite has changed $$\begin{bmatrix} b_{k+1} \\ a_{k+1} \\ v_{k+1} \end{bmatrix} = \begin{bmatrix} B'^+_{k+1}B'_k & 0 & \alpha B'^+_{k+1}T_3 \\ 0 & T_3 & 0 \\ 0 & 0 & (1-\alpha)T_3 \end{bmatrix} \begin{bmatrix} b_k \\ a_k \\ v_k \end{bmatrix} + \begin{bmatrix} B'^+_{k+1}(y'_{k+1} - y'_k) \\ 0 \\ 0 \end{bmatrix} + \begin{bmatrix} w''_{bk} \\ w''_{ak} \\ w''_{vk} \end{bmatrix}$$ (30)

where $B'^+_{k+1} = (B'^t_{k+1} B'_{k+1})^{-1} B'^t_{k+1}$ and $\alpha$ is a constant representing a property of multipath errors.

It is possible to easily estimate the baseline vector $b_k$, the floating ambiguity $a_k$ and the multipath error $v_k$ by applying the filter equation for updating the time as seen above even when there has been a change in the satellite information.

The invention is not limited to the aforementioned embodiments. It is also possible to estimate the floating ambiguity after the change in the satellite information from the baseline vector and floating ambiguity estimated before the change by using one of the following methods:

(A) Using a filter equation for updating the time generated without using a triple phase difference expressed by $B^+_{k+1}(y_{k+1} - y_k)$;

(B) Using a filter equation for updating the time generated by adding an unknown quantity for estimating speed as a substitute for the triple phase difference;

(C) Using a filter equation for updating the time generated by adding an unknown quantity for estimating acceleration; or (D) Using a filter equation for updating the time generated by adding unknown quantities for estimating speed and acceleration as a substitute for the triple phase difference.

What is claimed is:

1. A carrier-phase-based relative positioning device, comprising:
   at least two antennas mounted on a mobile vehicle or on a mobile vehicle and at a fixed location, one of said antennas being specified as a reference antenna; and
   means for estimating an integer ambiguity and a baseline vector from a result of observation of a single phase difference or a double phase difference based on radio waves transmitted by a plurality of position satellites and received by said antennas,
   wherein a new integer ambiguity is estimated from the previously estimated baseline vector or integer ambiguity when the number of positioning satellites has changed or when the reference position satellite has been switched.

2. The carrier-phase-based relative positioning device according to claim 1, further comprising a means for verifying and determining said integer ambiguity.

3. The carrier-phase-based relative positioning device according to claim 2, wherein when the number of positioning satellites has increased, the new integer ambiguity estimated only from said baseline vector estimated before the number of positioning satellites has increased.

4. The carrier-phase-based relative positioning device according to claim 2, wherein when the number of positioning satellites has decreased, the integer ambiguity after the reduction in the number of positioning satellites is estimated by excluding an estimated value of the integer ambiguity derived from the positioning satellite which has become unobservable.

5. The carrier-phase-based relative positioning device according to claim 2, wherein the double phase difference is used for estimating the integer ambiguity and, when the reference position satellite has been switched, the integer ambiguity after the switching of the reference position satellite is estimated by using a difference operation method in response to the reference position satellite switching.

6. The carrier-phase-based relative positioning device according to one of claims 3 to 5 or 2, wherein said means for verifying and determining the integer ambiguity determines the integer ambiguity when the reliability of the integer ambiguity has been verified a specific number of times from its successively detected estimated values.

7. The carrier-phase-based relative positioning device according to one of claims 3 to 5 or 2, wherein said means for verifying and determining the integer ambiguity determines the integer ambiguity when the same estimated value of the integer ambiguity has been successively detected a specific number of times.

8. The carrier-phase-based relative positioning device according to claim 2, wherein said positioning device uses a Kalman filter for estimating a floating ambiguity and the baseline vector from which the integer ambiguity is determined.

9. The carrier-phase-based relative positioning device according to claim 2, wherein said means for estimating and determining the integer ambiguity based on a floating ambiguity uses lambda notation.

10. A method to determine a relative position of a device that includes at least two antennas mounted on a mobile vehicle or on a mobile vehicle and at a fixed location, one of said antennas being specified as a reference antenna, the method comprising:

estimating an integer ambiguity and a baseline vector from a result of observation of a single phase difference or a double phase difference based on radio waves transmitted by a plurality of position satellites and received by said antennas, wherein a new integer ambiguity is estimated from the previously estimated baseline vector or integer ambiguity when the number of positioning satellites has changed or when the reference position satellite has been switched.

11. The method according to claim 10, further comprising verifying and determining the integer ambiguity.

12. The method of claim 11, wherein when the number of positioning satellites has increased, said estimating step includes estimating the new integer ambiguity only from the baseline vector estimated before the number of positioning satellites has increased.

13. The method of claim 11, wherein when the number of positioning satellites has decreased, said estimating step includes estimating the new integer ambiguity by excluding an estimated value of the integer ambiguity derived from the positioning satellite which has become unobservable.

14. The method of claim 11, wherein the double phase difference is used for estimating the integer ambiguity and, when the reference position satellite has been switched, said estimating step includes estimating the integer ambiguity by using a difference operation method in response to the reference position satellite switching.

15. The method according to one of claims 12 to 14 or 11, wherein the verifying and determining the integer ambiguity further comprises determining the integer ambiguity when the reliability of the integer ambiguity has been verified a specific number of times from its successively detected estimated values.

16. The method according to one of claims 12 to 14 or 11, wherein the verifying and determining the integer ambiguity further comprises determining the integer ambiguity when a same estimated value of the integer ambiguity has been successively detected a specific number of times.

17. The method of claim 11, wherein said estimating step includes using a Kalman filter for estimating a floating ambiguity and the baseline vector from which the integer ambiguity is determined.

18. The method of claim 11, wherein said estimating step includes using a lambda notation when determining the integer ambiguity based on a floating ambiguity.

19. The carrier-phase-based relative positioning device according to claim 1, wherein when the number of positioning satellites has increased, the new integer ambiguity is estimated only from said baseline vector estimated before the number of positioning satellites has increased.

20. The carrier-phase-based relative positioning device according to claim 1, wherein when the number of positioning satellites has decreased, the integer ambiguity after the reduction in the number of positioning satellites is estimated by excluding an estimated value of the integer ambiguity derived from the positioning satellite which has become unobservable.

21. The carrier-phase-based relative positioning device according to claim 1, wherein the double phase difference is used for estimating the integer ambiguity and, when the reference position satellite has been switched, the integer ambiguity after the switching of the reference position satellite is estimated by using a difference operation method in response to the reference position satellite switching.

22. The carrier-phase-based relative positioning device according to claim 1, wherein said positioning device uses a Kalman filter for estimating a floating ambiguity and the baseline vector from which the integer ambiguity is determined.

23. The carrier-phase-based relative positioning device according to claim 1, wherein said means for estimating and determining the integer ambiguity based on the floating ambiguity uses lambda notation.

* * * * *

UNITED STATES PATENT AND TRADEMARK OFFICE
CERTIFICATE OF CORRECTION

PATENT NO.        : 7,026,982 B2
APPLICATION NO.   : 10/758034
DATED             : April 11, 2006
INVENTOR(S)       : Hiroyuki Toda et al.

It is certified that error appears in the above-identified patent and that said Letters Patent is hereby corrected as shown below:

On Title Page, Col. 1

Please change Item (73) Assignee:

from Furuno Electric Ompany Limited to Furuno Electric Company Limited

Signed and Sealed this

Twenty-eighth Day of November, 2006

JON W. DUDAS
*Director of the United States Patent and Trademark Office*